his patent number: 5,323,430
Date of Patent: Jun. 21, 1994

United States Patent [19]
Termaat et al.

[54] METHOD AND SYSTEM FOR FINE CONTROL OF THERMAL POWER OF A BOILING WATER REACTOR WITH NATURAL CIRCULATION

[75] Inventors: Pieter K. Termaat, Arnhem, Netherlands; Katsuyuki Ara, Ibaraki, Japan

[73] Assignee: N.V. Tot Keuring Van Elektrotechnische Materialen (KEMA), Japan

[21] Appl. No.: 2,697

[22] Filed: Jan. 11, 1993

Related U.S. Application Data

[63] Continuation of Ser. No. 845,695, Mar. 4, 1992, abandoned, which is a continuation-in-part of Ser. No. 704,701, May 17, 1991, abandoned.

[51] Int. Cl.$^5$ ............................................. G21C 17/00
[52] U.S. Cl. ...................................... 376/258; 376/244
[58] Field of Search ............... 376/247, 258, 246, 241, 376/244; 73/295, 292; 374/148, 166; 976/DIG. 222

[56] References Cited

U.S. PATENT DOCUMENTS

| | | | |
|---|---|---|---|
| 4,418,035 | 11/1983 | Smith | 376/247 |
| 4,423,629 | 1/1984 | Ara et al | 73/295 |
| 4,440,717 | 4/1984 | Bevilacqua et al. | 376/247 |
| 4,449,403 | 5/1984 | McQueen | 73/295 |
| 4,590,472 | 5/1986 | Benson et al. | 340/870.04 |
| 4,901,061 | 2/1990 | Twerdochlib | 340/604 |
| 4,975,239 | 12/1990 | O'Neil et al. | 376/247 |
| 5,211,904 | 5/1993 | Oosterkamp | 376/258 |

OTHER PUBLICATIONS

A Reactor Vessel Level Monitoring System, an Aid to the Operators in Assessing an Approach to Inadequate Core Cooling, GE Power Systems, Oct. 21–23, 1991, San Francisco. Calif.

*Primary Examiner*—Donald P. Walsh
*Assistant Examiner*—Meena Chelliah
*Attorney, Agent, or Firm*—Ostrolenk, Faber, Gerb & Soffen

[57] ABSTRACT

A method and a system for fine control of the thermal power of a nuclear boiling water reactor (BWR) with natural circulation. The reactor vessel, in which the core of such a reactor is enclosed, embodies an in-vessel part of a water level gauge containing a water level sensor, such that together with the out-of-vessel part of the system, which is a signal conditioning and processing unit, the effective water level in the vessel can accurately be measured and adjusted either automatically or by hand. The in-vessel part of the system comprises a water level gauge, such as a vertical standpipe, in which the "steam-collapsed" or "effective" water level is accurately created. The effective water level is typically defined for a reactor vessel of a normally operating boiling water reactor (BWR), while partly containing liquid water, partly a mixture of steam and water, and partly just steam. A ternary-coding, hybrid digital-/analog thermocouple sensor with stand-alone capability is enclosed in the water level gauge, providing ternary-coded (−1, 0, +1) as well as analog (amplitude) signaling, such that by using an appropriate signal conditioning and processing unit, the water level in the gauge, relative to a reference level, is uniquely and very accurately determined. By the beneficial use of the analog information on water level contained in the signal transition curves, in addition to the digital information of the sensor signals, continuous water level readings can be obtained over the whole of a designed water level measuring range, this being independent of reactor water temperature or pressure. This accurate continuous level-measuring system is not limited to use in boiling water reactors, nor to water as a level-forming liquid.

28 Claims, 8 Drawing Sheets

FIG.9

METHOD AND SYSTEM FOR FINE CONTROL OF THERMAL POWER OF A BOILING WATER REACTOR WITH NATURAL CIRCULATION

CROSS REFERENCE TO RELATED APPLICATIONS

This is a continuation of application Ser. No. 07/845,695 filed on Mar. 04, 1992, now abandoned, which is a continuation-in-part of Ser. No. 07/704,701 filed May 17, 1991, now abandoned.

BACKGROUND OF THE INVENTION

The thermal power and the power distribution of a nuclear boiling water reactor with natural circulation, such as the Dodewaard reactor in the Netherlands, is controlled with neutron-absorbing control rods that are moved stepwise into and out of the core of the reactor. To compensate for fuel depletion while operating the reactor at full power, some control rods are quite frequently moved to new axial positions. Toward the end of a power cycle, all the control rods are gradually withdrawn from the core.

Figure 1:
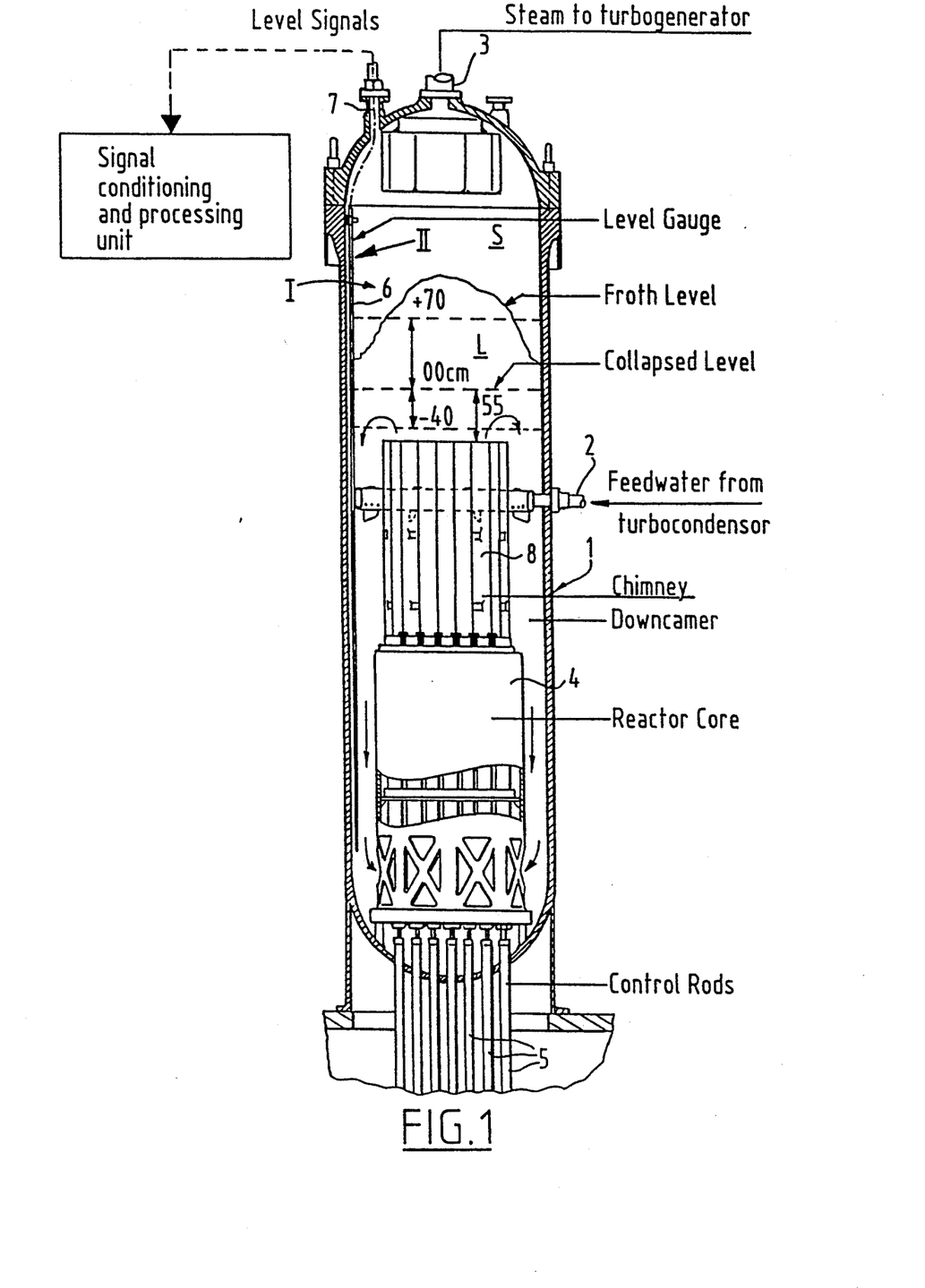
FIG. 1 is a view in section of the Dodewaard nuclear reactor.

The nuclear reactor is contained in a reactor vessel largely filled with water (see FIG. 1). During normal operation, much of the water is in the boiling phase, due to the nuclear heat produced in the reactor core. The uppermost part of the reactor vessel is filled with steam. This steam is fed to a turbogenerator in order to generate electricity. The water in the vessel is partly in gas phase and partly in liquid phase, its gas/liquid ratio depending on the thermal energy produced by the core of the reactor.

The interface between the steam and the boiling water, referred to as "froth level" in FIG. 1, is usually maintained at a constant position in the upper part of the vessel, by returning the condensed steam from the turbine condenser, referred to as "feed water" in FIG. 1, back to the reactor vessel with powerful high-pressure pumps.

No previous means have been capable of accurately detecting the position of the turbulent "froth level". A standpipe is normally connected on the outside of the vessel in which, on the principle of communicating vessels, a solid column of water is automatically created and in which the weight of the column is a measure of the position of the so-called "effective level" in the vessel. Pressure transducers connected to these standpipes provide level signals to the automatic control system to maintain the water level in the vessel at a fixed preset position. The reactor operators are able to manually change the set-point of this level control system.

However, during operation at high pressure and temperature, these generally applied pressure difference measuring systems suffer from decalibration effects. Moreover, during start-up and shutdown operations of the reactor system, this level measuring method is quite inaccurate, largely due to changing temperatures inside the vessel itself, as well as inside the standpipes located on the outside of the vessel.

SUMMARY OF THE INVENTION

Experiments with the Dodewaard reactor have shown that the thermal power of the reactor depends on the position of the effective level in the vessel. In fact, by deliberately moving the effective level up or down, within a certain safe range, by temporarily increasing or decreasing the feed water flow to the vessel, the thermal power of the reactor can be increased or decreased over a range of several percent. However, when it is intended to move the water level substantially up and down in the vessel during full power operation of the reactor, an accurate water level measuring system must be available. Without such a system, reactor operators are reluctant to move the water level noticeably up or down relative to its reference position.

Figure 2:
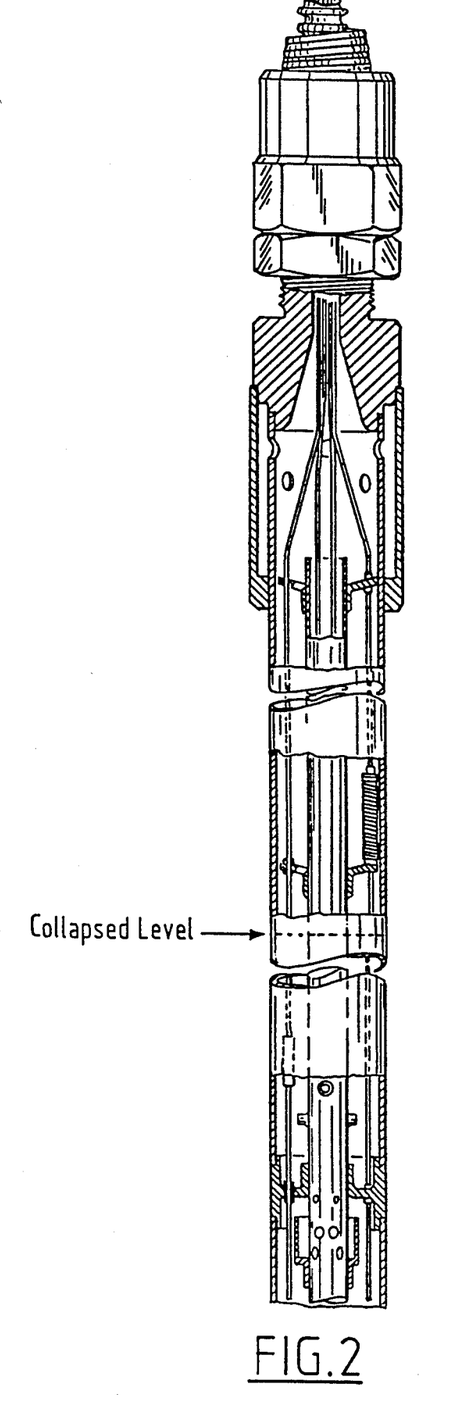
FIG. 2 shows an in-vessel water level gauge containing two sets of four binary coding differential thermocouples according to U.S. Pat. No. 4,423,629.

To overcome this problem, the present invention provides an in-vessel standpipe, referred to as a "water level gauge" in FIG. 2, mounted to the inside of the reactor vessel. Water temperatures inside and outside this standpipe are always identical, and therefore the position of the actual collapsed water level inside this water level gauge corresponds accurately to the hypothetical, unmeasurable collapsed level in the vessel itself (FIGS. 1 and 2).

Further, the present invention relates to a method for fine control of the thermal power of a boiling-water nuclear reactor with natural circulation, using reactor vessel water level control.

Another aspect of the invention relates to a system for accurately measuring the position of collapsed water level inside the reactor vessel, employing the above-described water level gauge.

Advantageously, the method and system of the invention relate to:

first control means (for causing stepwise movement of control rods) for primary control of the thermal power of the core;

second control means for fine control of the thermal power of the core by controlling the water level inside the vessel; and measuring means for measuring the collapsed water level in the vessel, mounted inside the vessel, and providing unique water level signals for finely controlling the output power of the reactor, either by hand or automatically.

Accordingly, the present invention provides, besides the conventionally employed neutron-absorbing control rods of the prior art, a second power control or power adjusting means, and a water level measuring system, for finely controlling the power of a boiling water reactor with natural circulation, using reactor vessel water level control.

It should be noted that the sensor systems and methods disclosed herein are not limited to the nuclear reactor field, but rather are also applicable in other fields in which fluid level is to be measured and controlled, for example the petrochemical field.

In the experiments with the Dodewaard reactor, it has been found that the water recirculation rate depends on the position of the water level in the vessel relative to the location of the inlet of the downcomer channel (see FIG. 1). The physical explanation for this phenomenon is that with lower water levels, high radial flow velocities exist near the entrance of the downcomer and a large amount of the steam generated in the core region is carried down with the circulating water. As a result, the water recirculation rate is reduced, so core steam content increases and core reactivity and core power are reduced. With higher water levels in the vessel, radial flow velocities are reduced and the steam generated in the core region can more easily escape into the upper part of the vessel. The water recirculation rate is then improved and core power increases.

More particularly, it has been discovered that if the water level is deliberately moved up, according to the method of this invention, within a safe operating range, then less steam is carried down into the downcomer and water circulation rate improves, so more cooling water flows through the core; therefore, the void content of the core decreases, causing an increase in core reactivity, so that fuel fission rate increases, and reactor power increases.

On the other hand, also according to the method of this invention, if the water level is moved down, within a safe operating range, then more steam is carried down into the downcomer and the water recirculation rate decreases, so less cooling water flows through the core; therefore, the void content of the core increases, causing a decrease in core reactivity, so that fuel fission rate decreases, and reactor power decreases.

Figure 3:
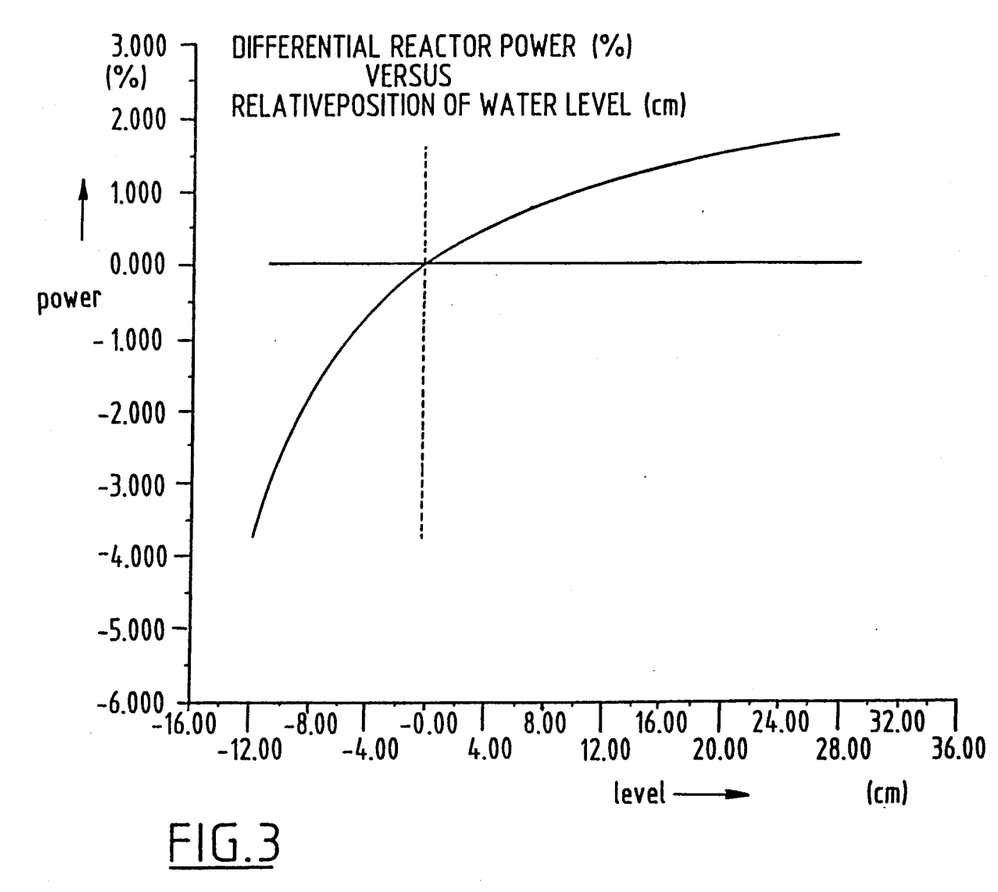
FIG. 3 is a graph showing reactor power versus water level obtained experimentally at the Dodewaard reactor at full power.

Therefore, by controlling the position of the water level in the vessel, the thermal power of the reactor can be finely controlled. FIG. 3 shows an example of experimental results, wherein a direct relationship is shown between differential reactor power and relative water level in the vessel.

By allowing the reactor operators to use this fine control method, the thermal power of the reactor can comfortably be tuned to its licensed maximum value. In this way, the time-integrated power production of the reactor system can be optimized.

Figure 2A:
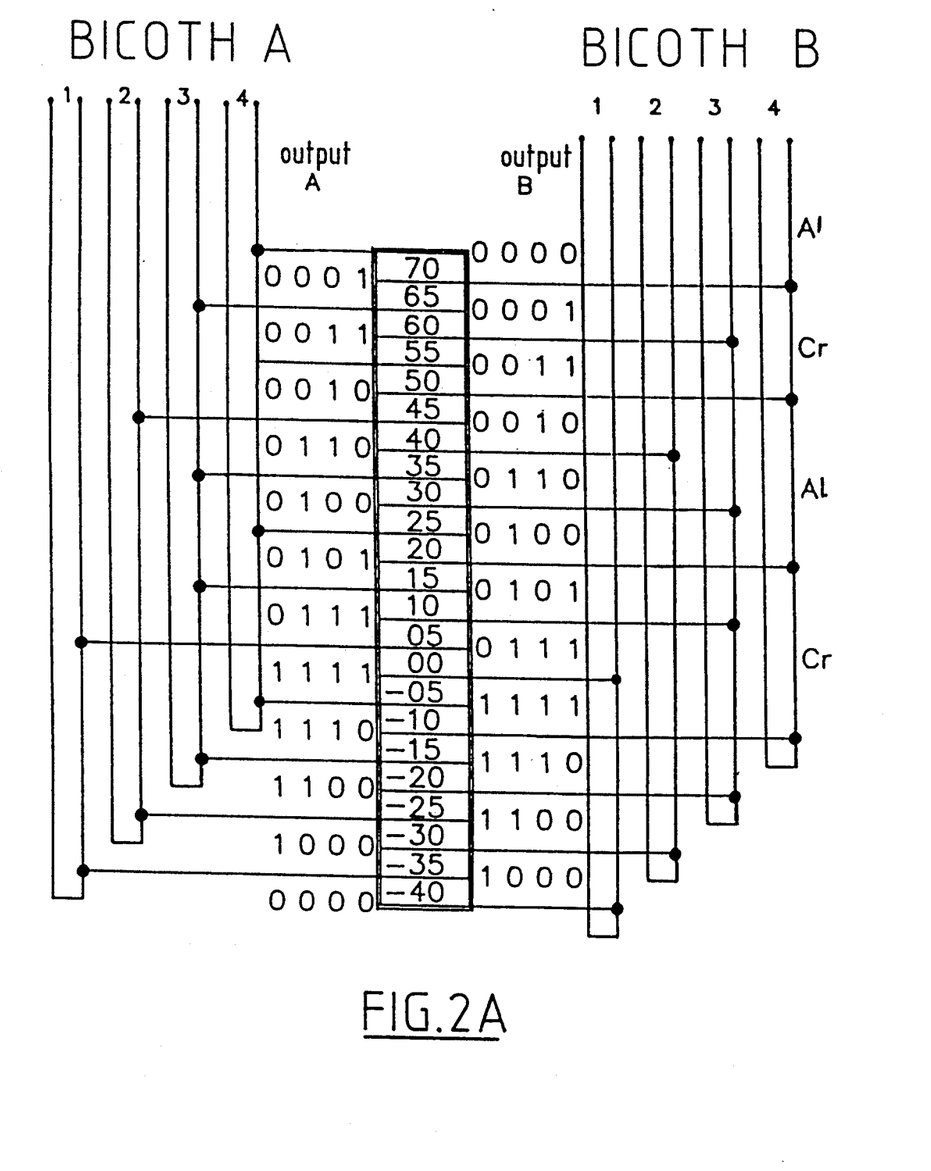
FIG. 2A shows schematically an arrangement of BICOTH sensors which may be applied in the water level gauge of FIG. 2 in the Dodewaard boiling water reactor.

In order to overcome the reluctance of the reactor operators to move the water level in the pressure vessel up and down by a substantial amount relative to its nominal position, an electrical level detecting system, based on a binary coding arrangement of heated differential thermocouples, referred to as the BICOTH system and shown in FIG. 2A, was successfully applied to the Dodewaard reactor. The BICOTH (binary coding thermocouple) sensor per se is disclosed in U.S. Pat. No. 4,423,629 of Ara et al., although those inventors did not disclose or suggest the reactor power control methods of this invention. The Ara et al. reference and any other prior art information mentioned herein is expressly incorporated by reference.

The binary coding sensors are positioned inside the water level gauge. The gauge communicates through internal and external narrow vent holes with the reactor vessel volume, such that inside the gauge, an almost stagnant collapsed level is created. The position of the water level in the gauge is detected by the BICOTH sensor arrangement. The readings of the conventionally applied differential pressure systems can be directly compared in the control room with the readings of the BICOTH system.

Although good results were obtained with the BICOTH system, it became clear that in practical applications this multiple-level detecting system results in a rather complex technical structure. Also, reactor operators are not content with its rather coarse, 5 cm stepwise resolution.

The present invention provides a system in which the measuring means comprises a stand-alone sensor including one or more wires of different thermocouple materials, the wires being conductively connected together through a common return wire at the bottom of the sensor. Using only one such sensor, many different level intervals of the water-steam interface can be detected. Moreover, by also using the analog information contained in the sensor signals, a continuous and smooth indication of the level of the water-steam interface can be obtained, as the level of the interface passes within the measuring range of each sensor.

This stand-alone, ternary-coding thermocouple sensor, referred to as a TRICOTH (ternary coding thermocouple) sensor, can therefore overcome the difficulties experienced with the BICOTH system as described above. Further, by the use of analog information contained in the BICOTH sensor signals as described herein, the usefulness of the BICOTH system can also be improved.

The ternary-coding, hybrid digital-analog TRICOTH sensor is installed inside a water level gauge similar to that described above.

Figure 4:
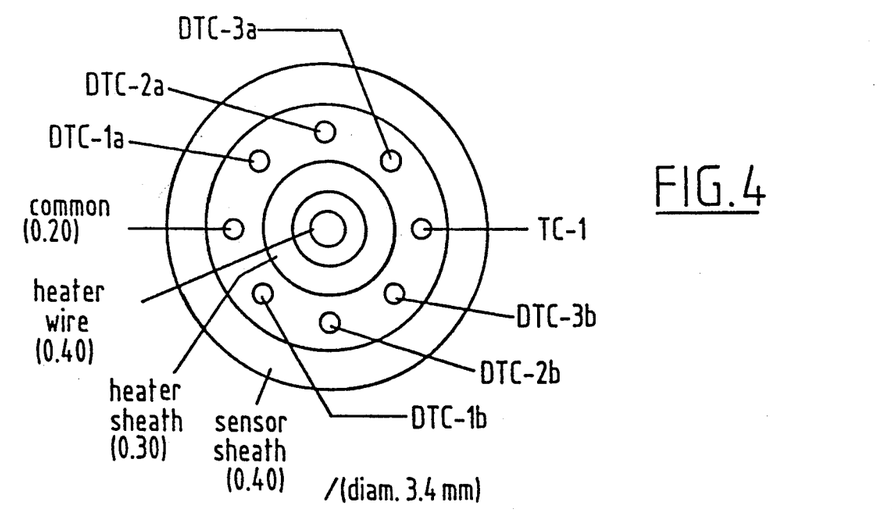
FIG. 4 is a radial cross-section of a TRICOTH sensor according to an embodiment of the invention.

The new type of level sensor uses three kinds of thermocouple materials, grouped together in such a way that a specific layout of differential thermocouple pairs is created. The sensor is heated on the inside by a central coaxial heater. The layout is shown in FIG. 4, which shows a radial cross-section of the TRICOTH sensor, and in FIG. 5, which shows an axial layout of the TRICOTH sensor.

In the region above the water level, the heat transfer coefficient from the sensor surface to the steam environment is much lower than in the region below, where the environment is water. Due to the internal heating, the sensor part protruding above the water level will become higher in temperature than the part submerged in the water. Therefore, a given sensor line will generate a positive or negative signal if the steam-water interface is located between two junctions which form a differential thermocouple pair in that line. Otherwise, the signal on that line will be zero.

Figure 5:
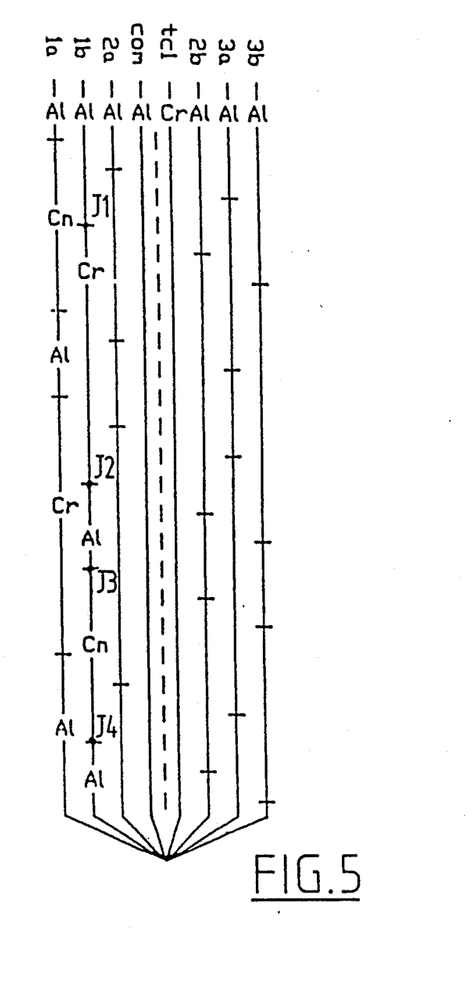
FIG. 5 shows the axial layout of the TRICOTH sensor.

Referring for example to line 1b in FIG. 5, junctions J1–J4 have been marked. The junctions J1 and J2 form a differential thermocouple pair. J1 is an Al/Cr junction, while J2 is a Cr/Al junction. The electromotive forces of these junctions are opposite in sign and cancel out when both junctions have the same temperature. This is the case when the water level is either below J2 (with J1 and J2 being at the same relatively high temperature), or above J1 (in which case J1 and J2 will be at the same relatively low temperature). With the water level between J1 and J2, on the other hand, junction J1 is at a higher temperature than J2, producing a negative differential output voltage (say $20° C. \times -40 \mu V/°C. = -800 \mu V$).

With the water level between the junctions of pair J3 and J4, a positive differential output voltage is produced (say $20° C. \times +40 \mu V/°C. = +800 \mu V$).

The signs of the output voltages are related to the types of thermocouple materials involved, as follows:

| | |
|---|---|
| Al/Cr - negative | wherein: |
| Cr/Al - positive | Al = alumel |
| Al/Cn - positive | Cr = chromel |
| Cn/Al - negative | Cn = constantan |

With the water level between J2 and J3, the output voltage equals zero, since J1 and J2 cancel out and J3 and J4 cancel out. This state is referred to as an active zero, since it has the same validity as an active positive or negative value. See, for example, the respective ternary codes of levels 12 and 13 in FIG. 6.

Summarizing the above, J1 and J2 are a "pair" producing a "+" code when the water level is between J1 and J2; and J3 and J4 are a "pair" producing a "−" code when the water level is between J3 and J4. J2 and J3 are not a "pair"; a "0" output voltage is produced when the water level is between J2 and J3.

Figure 6:
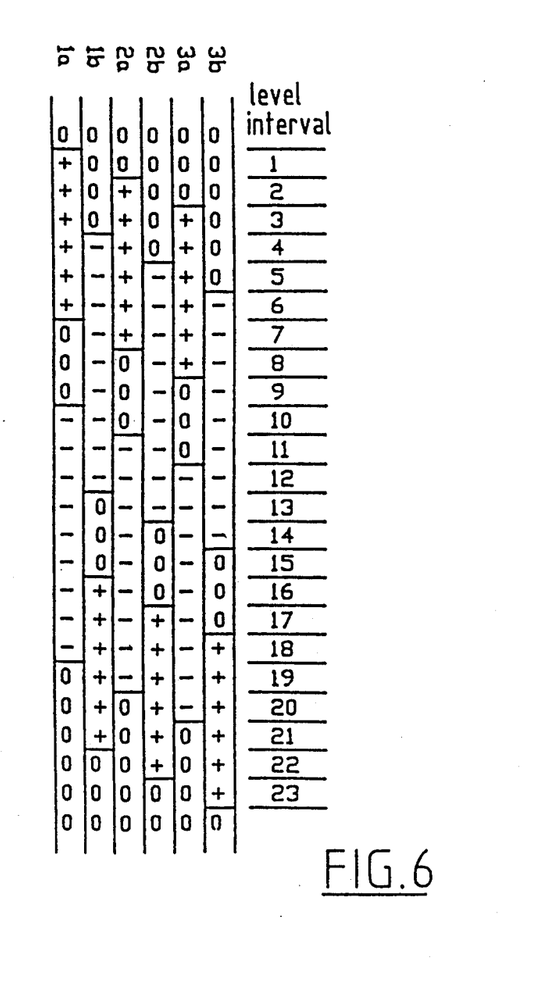
FIG. 6 shows the TRICOTH ternary code structure and corresponding level intervals.

Therefore, the TRICOTH sensor provides multi-digit ternary codes, each digit being either a positive (+), a zero (0), or a negative (−) electrical signal. All multi-digit codes correspond uniquely to small water level intervals as shown in FIG. 6, which shows TRICOTH six-digit ternary codes and corresponding water level intervals. With a wall-defined position of the sensor structure relative to a suitable reference point in the vessel, e.g., 55 cm above the top of the chimney as shown in FIG. 1, the ternary codes correspond uniquely to positions of water level intervals relative to that reference point.

Figure 7:
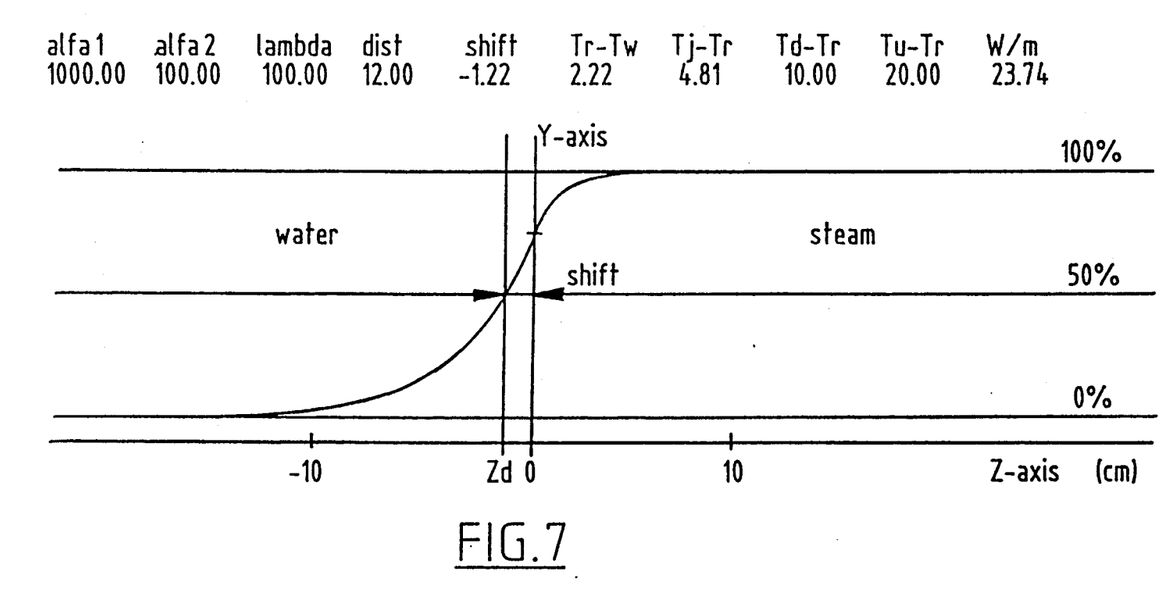
FIG. 7 shows the signal transition curve for a lower junction of a differential thermocouple pair in a TRICOTH signal line.
Figure 8:
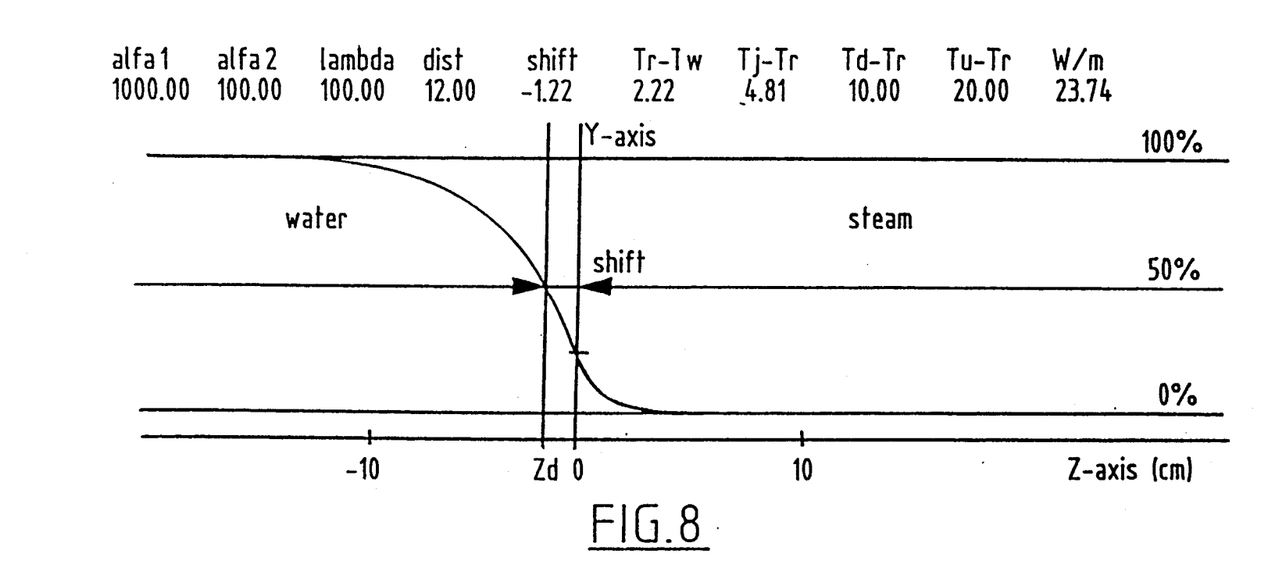
FIG. 8 shows the signal transition curve for an upper junction of a differential thermocouple pair in a TRICOTH signal line.

When the water-steam interface moves alongside the sensor structure, either up or down, sensor signals do not change stepwise in magnitude, but rather, follow the shape of a signal transition curve, as shown in FIGS. 7 and 8. This curve results from a smooth axial temperature transition curve which develops inside the sensor due to internal axial heat flow at the position of the water-steam interface, as shown. Therefore, ternary digit values derived from the signals of differential thermocouple pairs are based on 50% signal values, rather than on zero-versus-large-positive-or-negative signal values.

The shape of the signal transition curve is analytically well defined by solving a relatively simple first-order thermodynamic differential equation using proper values for sensor diameter, heat conductivity and heat transfer coefficients.

FIG. 7 shows a signal transition curve for a lower junction of a thermocouple pair and FIG. 8 shows a signal transition curve for an upper junction of a thermocouple pair. These are the two possible shapes of signal transition curves.

Consider for example a case where the water level is below junction J2 in FIG. 5, in the interval designated "13" in FIG. 6. Junctions J2 and J1 are both at a relatively high temperature and their emf's cancel out. The output voltage of line 1b is zero. Now, let the water level rise slowly. When the water level approaches J2, the temperature of J2 will slowly decrease to about water temperature and the output voltage of sensor line 1b will become negative as shown in FIG. 7, wherein "100%" indicates an output voltage of about −800 μV in this case. As soon as the output voltage of line 1b passes the 50% value (about −400 μV) the signal conditioning and processing unit indicates that the code of line 1b has changed from "0" to "−" and the water level must now be assigned to interval 12 (the codes of all the other lines being unchanged).

The shape and length of the transition curve depends on axial heat transfer inside the sensor and on the definition of the lower and higher values (5% and 95% signal value, for example).

The question is now, how is the interval boundary 13/12 related to the position of J2? (The position of J2 is well known from the design of the TRICOTH sensor and its position relative to a reference point.) As noted above, when the water level approaches J2 from below, the temperature of J2 is gradually pulled down to about water temperature. However, in fact, a 50% decrease in its temperature is already achieved when J2 is still above the water level interface. Therefore, a 50% signal decision level change occurs when the water level is a distance Zd (1.22 cm in this case) below the position of J2 in the TRICOTH sensor. This same principle applies for all the junctions in the sensor. In fact, all signal values generated by J2 to are related to shift distances Zn between the position of the water level interface alongside the sensor, and the position of the junction J2. For example, a 10% value corresponds to about 8 cm below the position of J2; a 25% signal value corresponds to a distance of 1.8 cm below the position of J2; a 75% signal value corresponds to a distance 0 cm below J2; and a 90% value corresponds to about 2 cm above J2.

Thus, all signal values making up the transition curve are related to small negative or positive shift distances relative to the position of the thermocouple junction under consideration. So, the true position of the steam-water interface, relative to the position of an "active" thermocouple junction, can accurately be deduced from the corresponding analog sensor line signal, by use of the solution of the above-mentioned thermodynamic equations, as soon as the junction considered is in reach of its signal transition curve.

Therefore, if distances between consecutive junctions are chosen to be less than the characteristic length of the signal transition curve, and signal normalization is performed relative to a full signal value, as present in other signal lines, then unique and continuous water level readings can be obtained over the whole measuring range of the hybrid digital-analog TRICOTH sensor. Thus, an important further aspect of the invention relates to a hybrid digital-analog sensor. When using only the 50% signal decision levels, only the ternary digital nature of the TRICOTH sensor is used and only 23 stepped level intervals can be assigned to the 6-digit ternary codings according to the design of FIGS. 4, 5 and 6. Any reasonable step size can be chosen. But by using in addition the analog information as explained above, a fine analog resolution for all consecutive level intervals is obtained.

Figure 9:
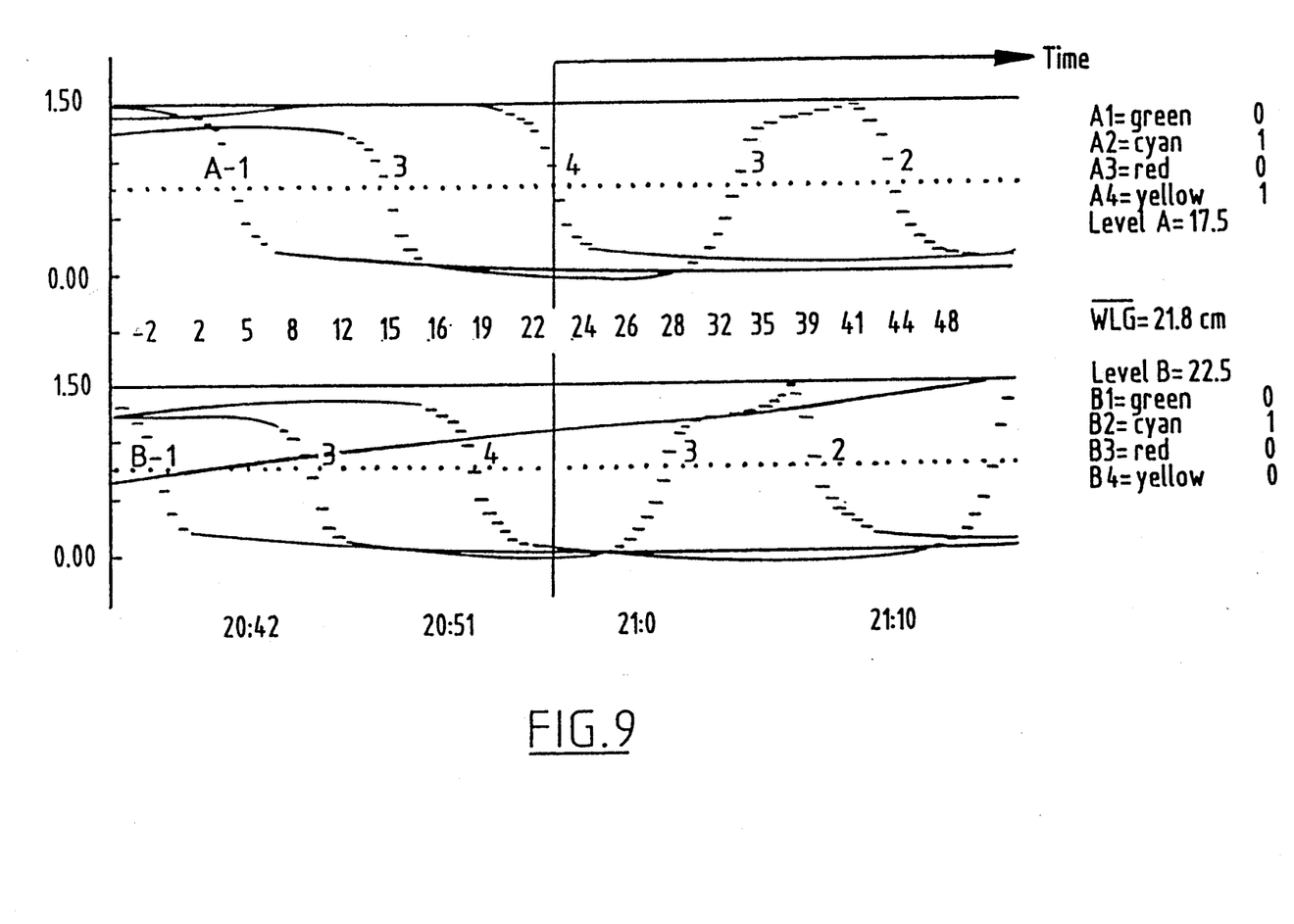
FIG. 9 shows the effect of combining the analog level information contained in the transition curves with the unique level interval indications obtained from the binary codes using the signals A1–A4 and B1–B4 in the prior art BICOTH system.

Proof of this principle is illustrated in FIG. 9, which shows continuous water level readings obtained in an experiment with the BICOTH system. The signals A1, A2, A3 and A4 are from the BICOTH-A group while the signals B1, B2, B3 and B4 are from the BICOTH-B group of the BICOTH system shown in FIG. 2A. The curve with the almost constant positive slope in the lower part of FIG. 9 shows continuous water level readings obtained using both the digital and the analog information from the 8 sensors. Numerical values corresponding to this line are presented in the center part of FIG. 9.

In generating FIG. 9, the water level in the vessel was slowly raised from a low value to a high value for testing purposes. At time 20:55 a binary code 0101 0100 is received by the signal processing unit, giving a digital result of $(17.5+22.5)/2=20.0$ cm. Referring to the codes in FIG. 2A for outputs A and B, it is seen that at this time, the water level is within the interval indicating the value of 20 cm above the reference point 00 cm.

Signal A4 is in its transition mode at time 20:55 and is close to changing from code 1 to code 0, indicating that the actual level is close to the upper boundary of the level interval, i.e., close to $20+2.5=22.5$ cm. Note that the actual shape of curve A4 in FIG. 9 corresponds to the theoretical shape presented in FIG. 8. Using the analog level information contained in the transition curve of signal A4 (generated by an upper thermocouple junction in line A4), the precise position of the collapsed water level is evaluated to be 21.8 cm.

The TRICOTH sensor is specially adapted to increase the feasibility of taking advantage of these principles. The sensor has good axial heat conductivity in order to stretch the transition curve, and axial distances between junctions is limited, for example to about 8 cm, such that in all situations at least one thermocouple junction falls within the range of the temperature transition curve.

Since the signals are generated by a fixed-positioned differential thermocouple structure, and only relative amplitudes of sensor signals are required, the water level readings obtained from a hybrid digital-analog TRICOTH system are independent of pressure and temperature and calibration is not required.

As described, the water level in the vessel of a boiling water reactor can be moved up and down within a safe operating range in order to increase or decrease the reactor power by a small amount. This physical phenomenon gives the reactor operators the opportunity to fine-tune the reactor power, in addition to the coarse power control mechanism provided by the stepwise-movable control rods. To detect or measure the water level inside the water level gauge, differential thermocouples are used, which provide digital codes (either binary or ternary) and also analog level information (as a result of the smooth temperature transition curve inside the thermocouple structure), from which the position of the steam-water interface is uniquely derived using appropriate computing means.

Therefore, reactor operators may have confidence in this hybrid level measuring system, and be willing to move the water level in the vessel noticeably up and down, in order to finely control the reactor power and optimize the time-integrated power output.

Other objects, features, and advantages of the invention will be appreciated from the following detailed description of an embodiment thereof, with reference to the drawings.

DETAILED DESCRIPTION OF EMBODIMENTS OF THE INVENTION

In a vessel 1 (FIG. 1) of the Dodewaard nuclear reactor in the Netherlands, provided with an inlet nozzle 2 for water and an outlet nozzle 3 for steam, is provided a reactor core 4, in which first control means or rods 5 are movable. In the vessel 1 there is formed an interface I between a liquid phase (L) and steam or gas phase (S), which may be rather turbulent. The interface I is far above the core 4 and above the chimney 8.

Secured to the inner wall of the vessel 1 is a gauge 6 in which sensors are provided which are connected to the outside through a nozzle 7 in the top of the vessel.

Inside the gauge 6, BICOTH sensor wires are provided according to the arrangement and design of FIG. 2A. For further details of the sensors, see Ara et al.'s U.S. Pat. No. 4,423,639. Further, low level sensor wires are provided for responding to very low levels of the water in the reactor. Inside the water level gauge 6, there exists an interface between liquid and steam phase, which corresponds accurately to the collapsed level in the vessel.

When the interface is situated between two thermocouple junctions of a BICOTH sensor there will be a different temperature at the uppermost thermocouple junction of the pair than at the undermost thermocouple junction as a result of poor heat transfer to the surrounding steam area. This temperature difference produces a positive voltage output of the sensor in situations wherein the interface is between two junctions of a thermocouple pair, or a zero voltage output wherein it is under or above two such junctions. The sensor output signals are supplied to a signal processing and conditioning unit.

FIG. 2A shows a BICOTH arrangement and design for the measuring of levels of the water-steam interface between +70 cm and −40 cm relative to a zero level which is situated exactly 55 cm above the top of the chimney. In this arrangement of FIG. 2A, eight BICOTH sensors are used.

In another embodiment of the present invention according to FIG. 4, a sensor known as a TRICOTH sensor is used in which a central heater wire 21 is insulated by an insulating sheet 22 from a heater sheet 23, outwardly of which eight wires 24 are uniformly embedded in a sheet 25 of $Al_2O_3$, which is enclosed by a cladding 26. In this embodiment the heating occurs uniformly to the eight wires such that they will all obtain substantially the same amount of heat. This arrangement also avoids electrical interference between the heater wire and the sensor lines.

Apart from a common wire 24 of Alumel and a wire tc1 of Chromel, six of the wires 24 each comprise three thermocouple materials, such that with the arrangement of FIG. 5, as can be seen from FIG. 6, 23 different levels can be measured. The wire tc1 is used just to measure water temperature, forming a thermocouple at the bottom of FIG. 5 with the common return wire com. The wires 1a, 1b, 2a, com, tc1, 2b, 3a, 3b are the eight wires 24 in FIG. 5. At the bottom, the eight wires are interconnected. Each crossbar on the wires in FIG. 5 represents one of the above-mentioned thermocouple junctions. The table at the right in FIG. 6 indicates that 23 levels are uniquely distinguishable by the ternary code structure at the left in FIG. 6.

The TRICOTH sensor is stand-alone; only one sensor needs to be used, having 6 ternary coding signal lines, as shown in FIGS. 4, 5 and 6. It uses three types of thermocouple materials, alumel, constantan, and chromel (FIG. 5), and produces positive signals, active zero signals, and negative signals in each sensor line, such that a given water level on the outside of the TRICOTH sensor generates uniquely a 6-digit ternary code (e.g., level 16 generates the code $-+-0-0$ as shown in FIG. 6). The TRICOTH sensor has a central coaxial heater which is the heat source over the length of the sensor and which is a central component for the generation of the sensor codes.

Compared to the BICOTH system consisting of 8 different sensors, the stand-alone TRICOTH sensor has advantages of simplicity as well as digital and analog precision. This is explained as follows.

Consider the TRICOTH system in an upright position, the water level at interval 16 (see FIG. 6), and the central heater switched on. Assume a stepwise axial temperature transition inside the sensor at the position of the water level, i.e., a lower temperature, almost the water temperature, below the water level, and a higher temperature (20 degrees C. higher for example) above the water level. Then, only the ternary code $-+-0-0$ is produced. However, due to axial conduction of heat, a smooth temperature transition curve exists inside the sensor instead of a stepwise transition. This temperature transition function moves with the water level. Therefore, analog signal transition functions (FIGS. 7 and 8) are created in the sensor lines. When the thermocouple junction of a sensor line is in range of the transition function, then the normalized amplitude of the sensor signal is an accurate analog measure of the position of the water level relative to that junction.

Therefore, for all level intervals, the combination of ternary codes and analog signal information provides unique and continuous water level readings over the whole measuring range of the hybrid digital-analog TRICOTH sensor.

What is claimed is:

1. A system for fine-control of the thermal power of a boiling water reactor with natural circulation, including a vessel in which a certain amount of water and steam is present and in which the core of the reactor is arranged, comprising:
   control means for enabling fine-control of the thermal power of the reactor by controlling the position of the water level in the vessel, relative to a certain reference position, by increasing or decreasing a feedwater flow to the vessel; and
   measuring means for measuring a position of an effective water level in the vessel, mounted inside the vessel, and providing water level indications to said control means.

2. A system in claim 1, wherein said measuring means mounted inside the reactor vessel comprises an upright standpipe, having internal and external vent holes at several elevations which communicate with the volume of the reactor vessel such that inside the said standpipe a stable water/steam interface is created, the position of which is indicative of the effective water level in the vessel.

3. A system as in claim 1, wherein said measuring means comprises a ternary-coding, hybrid digital-/analog liquid level sensor, having a central coaxial heater, surrounded by symmetrically distributed composite thermocouple lines and operable for assigning indications of water level to predetermined level intervals, said level indications being substantially independent of temperature and pressure.

4. A system as in claim 3, wherein said measuring means employs an axial temperature transition function existing inside the sensor at the location of the water level interface, such that the interface creates signal transition functions in the thermocouple lines, which form a source of analog information of the position of said interface, relative to positions of thermocouple junctions, and providing continuous water level indications over a measuring range of said sensor.

5. A system as in claim 4, wherein said measuring means includes a signal conditioning and processing unit with a readout for providing said water level indications.

6. A system as in claim 5, wherein said signal conditioning and processing unit is outside said reactor vessel.

7. A system as in claim 1, wherein said control means enables manual fine water level control by a reactor operator at a location of said water level indications.

8. A system as in claim 1, wherein said control means automatically provides fine water level control in response to said water level indications.

9. A system as in claim 1, wherein said control means adjusts said water level to higher and lower positions relative to a reference position in the vessel within a safe operating range so as to adjust the thermal power of the reactor to higher and lower values.

10. A system as in claim 1, the system comprising:
    measuring means exposed to the fluid in the vessel for measuring the level of the interface between liquid and gas phase of the fluid; and
    means for mounting said measuring means inside the vessel but outside the core, for providing a measuring signal for including the fluid level inside the vessel.

11. A system as in claim 10, further comprising an upright pipe in the vessel in which the measuring means are provided, the upright pipe being secured to the wall of the vessel outside the core.

12. A system as in claim 10, wherein the measuring means comprises a plurality of wires, each having a plurality of thermocouples in series along the wire, said thermocouples being disposed at different levels in the vessel, and further comprising computing means for receiving voltages generated by thermocouples in each said wire, and on the basis of said voltages, determining the level of the liquid-gas interface.

13. A system as in claim 3, said measuring means comprising at least six wires each having at least four thermocouples.

14. A system as in claim 13, wherein said computing means is capable of distinguishing at least 23 distinct levels of the liquid/gas interface based on said voltages.

15. A system as in claim 12, wherein said computing means is responsive to both digital and analog information in said signals.

16. A method for fine-control of the thermal power of a boiling water reactor with natural circulation, including a vessel in which a certain amount of water and steam is present and in which the core of the reactor is arranged, comprising:
    a method for fine-control of the thermal power of the reactor by controlling the position of the water level in the vessel, relative to a certain reference position, by temporarily increasing or decreasing the feedwater flow to the vessel and an method for measuring the position of the water level in the vessel, mounted inside the vessel and connected to a signal conditioning and readout unit in the control room in order to provide unique water level readings to the operators.

17. An method as in claim 16, mounted inside the reactor vessel and comprising an upright standpipe, having small internal and external vent holes at several elevations which communicate with the volume of the reactor vessel such that inside the said standpipe a stable water/steam interface is created, the position of which corresponds with the effective collapsed water level in the vessel itself.

18. An method as in claim 16, comprising a ternary coding, hybrid digital/analog liquid level sensor, having a central coaxial heater, surrounded by symmetrically distributed composite thermocouple wires and able in boiling water reactors to assign uniquely positions of water levels in the vessel to small level intervals, and additionally, level indications being independent of temperature and pressure and calibration is not required.

19. A method as in claim 16, comprising the use of the axial temperature transition function existing inside the BICOTH or TRICOTH sensor at the location of the liquid level interface, which creates signal transition functions in the differential thermocouple lines, which form a source of analog information of the position of said interface, relative to positions of thermocouple junctions, such that accurate and continuous liquid level readings can be obtained over the whole measuring range of said sensor; using a signal conditioning and read out unit.

20. A method as in claim 16, comprising the steps of:
detecting a level of a water-steam interface within a vessel of said reactor, which contains said reactor core, and
adjusting said level of said interface so as to control the thermal output power of the reactor.

21. A system as in claim 12, wherein said thermocouples are defined by junctions between two different materials along the length of each said wire, whereby the voltage on a given one of said wires takes one of two predetermined levels, when said liquid-gas interface is substantially away from each of the thermocouples along that given wire.

22. A system as in claim 21, wherein the voltage on a given one of said wires takes transitional levels between said two predetermined levels when said liquid-gas interface is substantially near one of the thermocouples along that given wire.

23. A system as in claim 22, wherein said computing means determines said liquid-gas interface location at least in part by analog detection of said transitional voltage levels.

24. A system as in claim 21, wherein said measuring means comprises at least four wires, each having at least two thermocouples.

25. A system as in claim 24, wherein two of said wires contain two thermocouples, and the other two wires contain three and four thermocouples, respectively, whereby said computing means is capable of distinguishing at least 12 distinct levels of the liquid-gas interface on the basis of said voltages.

26. A system as in claim 12, wherein said thermocouples are defined by junctions between three different materials along the length of each said wire, whereby the voltage on a given one of said wires takes one of three predetermined levels, when said liquid-gas interface is substantially away from each of the thermocouples along that given wire.

27. A system as in claim 26, wherein the voltage on a given one of said wires takes transitional levels between said three predetermined levels when said liquid-gas interface is substantially near one of the thermocouples along that given wire.

28. A system as in claim 27, wherein said computing means determines said liquid-gas interface location at least win part by analog detection of said transitional voltage levels.

* * * * *

UNITED STATES PATENT AND TRADEMARK OFFICE
CERTIFICATE OF CORRECTION

PATENT NO. : 5,323,430
DATED : June 21, 1994
INVENTOR(S) : Termaat, et. al.

It is certified that error appears in the above-indentified patent and that said Letters Patent is hereby corrected as shown below:

Title page, item [73], Assignee: should read--N.V. Tot keuring Van Elektrotechnische Materialen (KEMA), The Netherlands Japan Atomic Energy, Research Institute, (JAERI), Japan--.

Signed and Sealed this

First Day of November, 1994

Attest:

BRUCE LEHMAN

Attesting Officer

Commissioner of Patents and Trademarks